Oct. 9, 1962 P. GALLONE 3,057,984

SWITCH FOR ELECTROLYTIC CELL

Filed Nov. 19, 1959 2 Sheets-Sheet 1

INVENTOR
PATRIZIO GALLONE
BY Hammond & Littell
ATTORNEYS

SWITCH FOR ELECTROLYTIC CELL
Filed Nov. 19, 1959
2 Sheets-Sheet 2
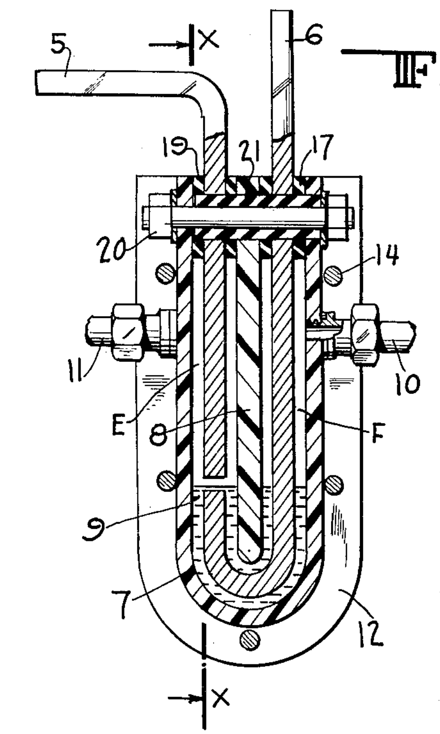
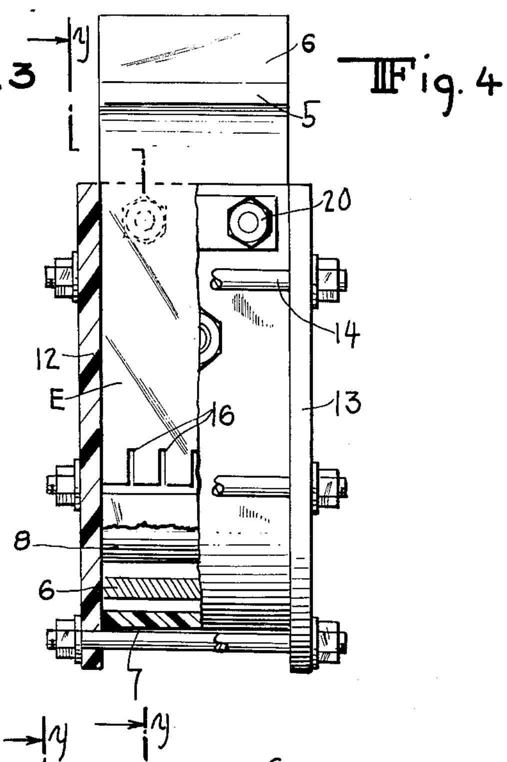
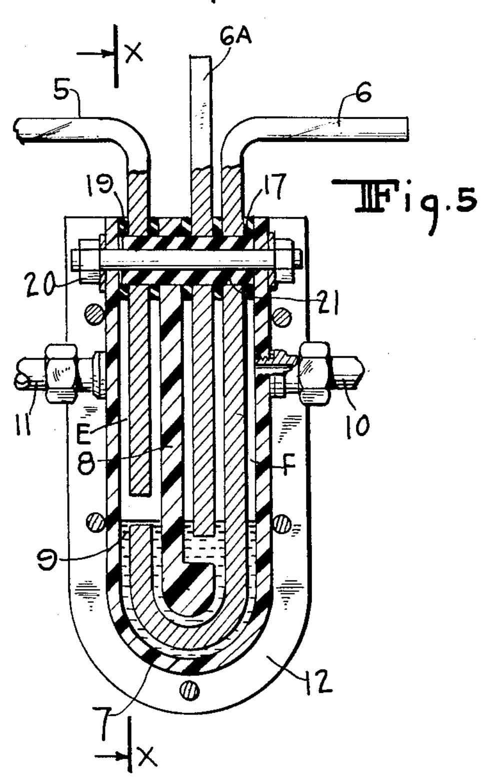
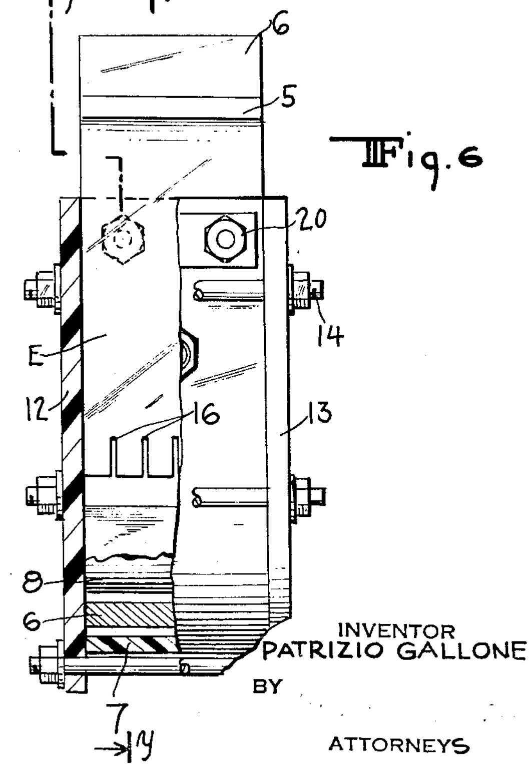
INVENTOR
PATRIZIO GALLONE
BY
ATTORNEYS United States Patent Office 3,057,984

Patented Oct. 9, 1962

3,057,984

SWITCH FOR ELECTROLYTIC CELL

Patrizio Gallone, Milan, Italy, assignor to Oronzio de Nora Impianti Elettrochimici, Milan, Italy, a corporation of Italy Filed Nov. 19, 1959, Ser. No. 854,039

7 Claims. (Cl. 200—152)

This invention relates to a new apparatus for switching in and out the individual cells of an industrial electrolysis circuit. The new switching means of my invention makes use of liquid mercury or any other liquid metal to form one of the contact elements and embodies means to change the free level of the mercury, in order to establish or interrupt the current through the cell in the most efficient way.

My invention is based upon the finding that the peculiar characteristics of an electrolytic circuit consisting of a number of cells in series or in parallel in conjunction with the normal conditions under which the switching in or shutting down of any one single cell takes place, while the other cells in the circuit are kept on load, are particularly favorable to the use of a switching apparatus of the type forming the object of this invention. In fact, the normal operation by which the shutting down of any one single cell is accomplished consists, at least in a first stage, of shortcircuiting the cell by establishing an electric continuity between the two branches of the electric lines that are connected with the anode and the cathode of the cell respectively. Since the inductance of the circuit element formed by one cell with its anode and cathode connections is in general very small, the induced tensions and currents arising in such operation are also relatively very small. Consequently, the thermal energy that is dissipated by the making or breaking arc is also small and can thus produce only a negligible evaporation of a mercury contact in a switch. From this fact, as well as from the fact that the cell voltage required to carry out the electrtolysis process is generally not higher than a few volts, it results that the conditions which prevail are not favorable for the establishing of a permanent arc. I have found this true in spite of the general opinion that, due to the danger of arcing and evaporation, the adoption of switching devices embodying liquid metal contacts are generally considered to be unsuitable where large amounts of electrtic energy are employed for industrial applications.

Furthermore, a switching apparatus such as disclosed by my invention offers considerable advantages over the conventional switching means embodying only solid contacts, as known heretofore in industrial electrolysis. Indeed, some of the modern electrolytic cells are rated for many thousands of ampere, so that the switches of conventional type must correspondingly increase in size, thus becoming very expensive, due to the necessity of not overeloading the solid contacts, since any overloading might cause a considerable voltage drop while the cell is operating and an excessively rapid wearing out of the contacts by the making and breaking arcs. In addition to being very expensive, the big switches of conventional type, as are required for the cells of largest current capacities, entail considerable difficulties in finding an adequate installation for them on the bus lines and in keeping down to an acceptable limit the manual effort that is required for their operation.

It is an object of my invention to provide an electrical switch for switching in and out electrtolytic cells in a circuit wherein a liquid metal is used as the contact means.

It is a further object to provide a switch which does not require metal contacts of a large area.

Another object is to provide such a switch having relatively small contact areas which does not produce a large voltage drop across the contact points.

Yet another object is to provide a switch which is relatively small in relation to the current capacity, may be easily installed in the bus lines and requires a minimum of manual operation.

These and other objects of my invention will become apparent as the description thereof proceeds.

The above objects may be attained and the outlined disadvantages of the prior art switches are eliminated by using a device constructed in conformity with my invention. Beside being much easier to install and to operate, such device offers the further advantage that no appreciable wear is suffered even by that part of the switching contact that is formed by the solid metal element or elements in contact with mercury. Indeed, it has been found that the thin layer of mercury which coats the solid contact element is sufficient to protect this from the destroying action of the making and breaking arc, possibly by virtue of the heat absorbing effect that is locally exerted by the partial evaporation of the mercury layer, however small such evaporation might be. Consequently, the solid contact need not consist of any special heat-resistant alloy. On the contrary, it has been found that the best metal to form a solid contact element is copper, possibly because this metal is easily amalgamated, so that it builds up a continuous and consistant coating of meercury. The whole construction of the apparatus may thus be considerably simplified, since, according to one of the features of my invention, the solid contact element may be formed in a very easy way by an extension of the same copper bus line that supplies the current to the cell.

Referring, now, to the drawings which illustrate some preferred forms of embodiment of my invention:

FIGS. *1a* and *1b* are a diagrammatic illustration of a pair of electrolytic cells with the switch of my invention applied to one cell, showing the liquid metal level in the two positions whereby one cell is on load or shortcircuited respectively.

FIGS. *2a* and *2b* are a diagrammatic illustration of an alternative embodiment of my invention.

FIG. 3 is a part sectional end view of a switching means suitable for use in carrying out the principles of my invention according to the embodiment illustrated in FIG. *1a*, *1b*, with the section taken along line Y—Y of FIG. 4.

FIG. 4 is a part sectional lateral view of the switch illustrtated in FIG. 3, with the section taken along line X—X of FIG. 3.

FIG. 5 is a part sectional end view of a switching means suitable for use in carrying out the principles of my invention according to the embodiment illustrtated in FIGS. *2a* and *2b*, with the section taken along line Y—Y of FIG. 6.

FIG. 6 is a part sectional lateral view of the switch illustrated in FIG. 5, with the section taken along line X—X of FIG. 5.

Figure 1B:
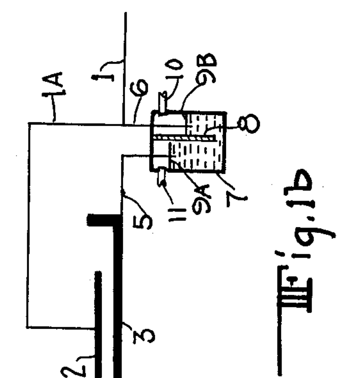

In the embodiment of invention illustrated in FIGS. *1a* and *1b* the electrolytic cell C having the switching means is diagrammatically represented by an anode 2 and by a trough 3. For sake of simplicity, in the exemplifying set-up as shown in these figures the trough base is at the same time performing also the function of a cathode, so that it is directly connected with the bus line 4, whereas the anodic connection 1A is the extension of bus line 1, connected to the base of the next adjacent cell. The switching means, which is disclosed in greater detail in later paragraphs and in FIGS. 3 and 4, is formed by a completely enclosed vessel 7, provided with an intermediate partition 8 which extends vertically and horizontally throughout the vessel but leaving an opening at the bottom, whereby the vessel is subdivided into two inter-communicating chambers, E and F. From the junction of bus line 1 with extension 1A a conductor 6 branches downward through the top and into the interior of one of said communicating chambers shown as F, and a conductor 5 connected to the base of the cell extends downward through the top and into the volume of the other chamber E.

The vessel 7 is partially filled with a liquid metal, such as mercury, to form a pool 12 having a free level 9. By virtue of the vent openings 10 and 11 with which the two intercommunicating chambers are provided at their tops, the liquid level 9 is normally the same in both chambers E and F, as shown in FIG. 1*a*.

The length of the conductor 6 is such that its end is permanently dipping into the pool of mercury 12. The conductor 5 ends above the free level 9 of mercury pool 12. Under such conditions, with the mercury at free level 9, the circuit element formed by the bus line 1, the conductor 6, the mercury pool and the conductor 5 is open. Therefore, the current that flows through the other cell D of the electrolysis circuit having anode 2A, trough 3A and anode conductor 1B, passes from the line 1 and the connection 1A through the electrodes 2 and 3 of the cell C, which is thus also energized and from which the current can continue to flow to the line 4 and thereafter to an adjacent cell, not shown.

Figure 1A:
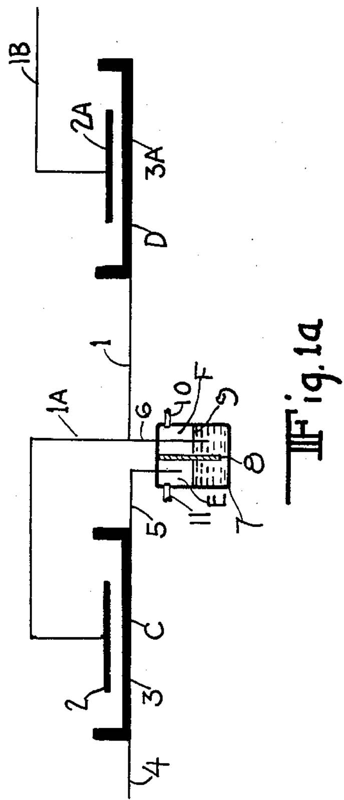

In FIG. 1*b*, new conditions are illustrated which will be established when the mercury level is raised in chamber E to level 9A, by means of any suitable means so as to make contact with conductor 5 and lowered in chamber F to level 9B, without interrupting the contact with conductor 6. Under such conditions a metallic continuity is established, through the mercury pool 12, between line 1 and line 4, so that the cell is shortcircuited and the current flows freely through the other cells in the circuit while cell C is kept deenergized. The current flows from cell D through lines 1, 6, pool 12, line 5 and line 4 to the next adjacent cell, not shown.

The same results would obviously be obtained if in the above embodiment the line 1 and conductor 6 were considered as being cathodic, while the cathodic line 4 and conductor 5 were considered to be anodic. The same results would obviously be obtained also if the system were composed of a number of cells in parallel, instead of in series as formerly considered.

For the purpose of causing a displacement of level 9 in the mercury pool 12, so as to shortcircuit the cell C, one most suitable means consists of applying a pressure through the vent 10 into chamber F, or else a suction from the vent 11 from chamber E. Such pressure or suction must be maintained during the entire time which the cell must be kept shut down. This represnets no difficulties, and may be accomplished by using any of the well known methods for keeping a definite value of pressure differential between two separate environments.

Figure 2B:
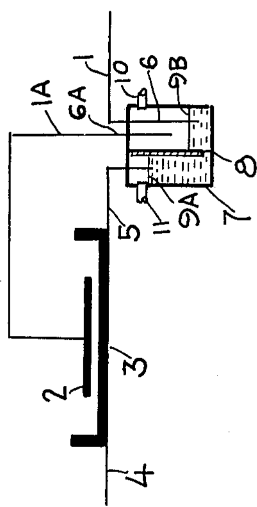
Figure 2A:
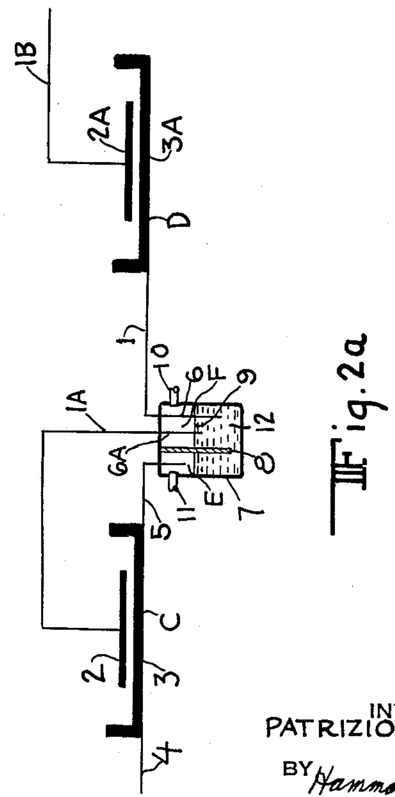

The alternative embodiment of my invention as illustrated in FIGS. 2*a* and 2*b* concerns its application to a switching method and apparatus as disclosed in the United States Patent No. 2,834,728 granted May 13, 1958. Such method affords the possibility of insuring protection from corrosion to the cathodic elements of the cell, as soon as the cell is shut down, by breaking the shortcircuit between the anode 2 and the cathode 3 even though keeping the cell C deenergized. This can be accomplished, according to the embodiment illustrated in FIGS. 2*a* and 2*b*, by providing the anodic line 1 with an extension 6 and the anodic connection 1A with an extension 6A, such extensions being both protruding into one of two intercommunicating chambers partially filled with mercury shown as chamber F. A cathodic extension 5 protrudes into the other intercommunicating chamber E. When the mercury level 9 of mercury pool 12 is the same in both chambers E and F, the mercury is in contact with both extensions 6 and 6A, thus providing the metallic continuity between the line 1 and the anodic connection 1A, while the cathodic extension 5 is of such length and depth that the contact is interrupted between it and the mercury level 9 in chamber E. Under such conditions, the electric continuity between the line 1 from cell D and the cathodic branch line 4 of the bus line can be established only through the cell C itself, by way of line 1, pool 12, lines 6A and 1A, anode 2, cathode 3 and line 4. Thus, cell C is energized if the electrolysis circuit is on load.

The line extensions or conductors 5, 6 and 6A are of increasing lengths, so that, if the mercury pool 12 is gradually displaced from one chamber to the other, i.e., from chamber F to E, the sequence of the making and breaking of the several contacts between the mercury and the three conductors will be the following: first the mercury level 9A makes contact also with the conductor 5 in chamber E, so that, all the three conductors 5, 6 and 6A are at this stage in contact with the mercury pool 12, the current, instead of passing from the line 1 to the connection 1A and then through the cell C, will jump through the mercury pool 12 and the cathodic connection 5 directly to the line 4, so that the cell C will be temporarily shortcircuited. If the displacement of the level 9A of mercury pool 12 is then raised further, conductor 6A will be completely above and out of contact with mercury level 9B so that the electric continuity between the line 1 and the extension 1A, as well as between the line 4 and the extension 1A, will be interrupted. The temporary shortcircuit will thus be opened, but the cell C will remain deenergized, because the electrolysis current will continue to flow along the bus lines 1 and 4 via the conductor 6, the mercury pool 12, and the conductor 5, thus traveling from cell D to the next cell beyond cell C, not shown, without passing through cell C.

While any suitable device adapted to provide a liquid metal contact between the several circuit elements to be connected or disconnected may be used, I have found the switches illustrated in greater detail in FIGS. 3 to 6 particularly well adapted for use according to my invention.

In FIGS. 3 and 4 all the essential elements described in the foregoing lines are shown also: they are the mercury vessel 7, the conductor 5, to be permanently connected with one of the cell electrodes; the conductor 6, to be permanently connected to the other cell electrode; the partition 8, dividing the vessel into two intercommunicating chambers E and F; the mercury pool with its free level 9. When the free level is the same in both chambers, the end of conductor 5 is detached from and a little above free level 9, while the lower part of conductor 6 is submerged, under mercury. According to a preferred mode of construction as shown in the FIGURE, the end part of conductor 6 in chamber F extends underneath the partition 8 and into the other chamber E until reaching a level quite close to the free level 9 of mercury. In this way one obtains a considerable advantage in that, when the mercury level increases in chamber E, so as to make the contact with conductor 5, the path followed by the current will mainly be formed by the copper conductors and only for a very minor distance by the mercury, the resistivity of which is considerably higher than for copper. In this way, the voltage drop through the connection thus established between the positive and the negative parts of the bus line will be kept as small as possible.

In order to obtain a compact construction with a minimum holdup of mercury for a given area of solid-to-liquid metal contact surface, the body of the vessel 7 is preferably given a U-shape with open extremities, which are closed by means of end plates 12 and 13 and bolts 14, with the interposition of gaskets if required.

The fluid-tight assembly formed by the conductors 5 and 6 and the vessel 7 is obtained at the top of the latter by means of insulating spacers 17, inserted between the partition 8, the conductors and the vessel itself. Due to the flexibility inherent in the U-shape of the vessel, the walls of this can be easily tightened inward by means of bolts 20, so as to exert a pressure on the gaskets 17. These bolts pass through holes drilled in each conductor 5 and 6 with the interposition of insulating bushings 21. This arrangement allows the conductors to perform at the same time a supporting function for the whole switch appartus.

The body 7 of the vessel, as well as its end plates 12 and 13, can be fabricated of metal, in which case it is recommendable, even though not strictly necessary, that they be lined with an insulating material. However, in a preferred mode of construction, these parts are made of a transparent synthetic material, such as an acrylic resin, which has good insulating qualities and a sufficient mechanical rigidity. The choice of a transparent material offers an important advantage in that the mercury level 9 is thus visible and therefore more easily adjustable with regard to the quantity of mercury required for the filling as well as to proper leveling of the apparatus when it is installed. It is indeed important that the leveling be accurately carried out in such a way that the end surface of each of conductors 5 and 6 be horizontal, so that the making and breaking of its contact with mercury may take place at all points simultaneously, thus insuring a uniform distribution of the arc and of its thermal effects.

In order to insure the best possible arc distribution, the end portion of the conductor 5 can be provided with vertical notches 16 that are cut throughout the metal thickness: such notches have the purpose of subdividing the mercury in a number of streams, whenever its level is lowered to break the contact, so that the last drops bridging the arc will be evenly distributed along the lower end surface of the conductor.

The alternative embodiment illustrated in FIGS. 5 and 6 differs from the one described in the embodiment of FIGS. 3 and 4 only in that it includes also a third conductor 6A, whose function has been fully explained in the above description of FIGS. 2*a* and 2*b*. Conductor 6A is also provided with notches 16 in the same manner as conductor 6. In addition, the partition 8 may have a slightly different construction as shown in FIG. 5.

While I have described, for illustrative purposes, some preferred embodiments of my switching device, it will be understood that this is for illustrative purposes only and that the principles of my invention may be applied to other modes of construction without departing from the spirit of my invention or the scope of the following claims. For example, the shape of the vessel containing the liquid metal and the shape and arrangement of the conductors therein might be different from those illustrated in the foregoing description; moreover, the length and depth of the conductors 5 and 6 might be established in such a way that the electric continuity between said conductors is established by the liquid metal 12 when its free level 9 is the same in both intercommunicating chambers, in which case such electric continuity would be interrupted by causing the level to change in the chambers. Moreover, other metals besides mercury may be used as long as they are liquid at low temperatures, for example cesium or gallium.

I claim:

1. A switch for switching out an individual cell in an electrolytic circuit of high current capacity having a plurality of cells which comprises an enclosed vessel divided into two chambers interconnecting at the bottom of said vessel, a pool of liquid metal partially filling both of said chambers, an electrical contact from the anode of said individual cell dipping into one of said pools of liquid metal and extending into the other of said pools to a point below the surface thereof, an electrical contact from the cathode of said cell suspended above the surface of the other of said bodies of liquid metal, said cathode contact having vertical grooves at the mercury contact end, and means to change the level of said liquid metal within the chambers to control the electrical contact between said electrical contacts from said anode and said cathode, to short circuit said individual cell.

2. A liquid metal switch for selectively connecting in series and switching out an individual cell in an electrolytic circuit of high current capacity having a plurality of cells, which comprises an enclosed vessel divided into two chambers interconnecting at the bottom of said vessel, a pool of liquid metal partially filling both of said chambers, conductor means to connect the cathode of a cell to the anode of an adjacent cell through the liquid metal in one of said chambers, conductor means from the cathode of said adjacent cell to a point above the liquid metal in the other chamber and means to change the level of said liquid metal within the chambers to control the electrical contact between said electrical conductors within the said chambers.

3. A liquid metal switch for selectively connecting in series and switching out an individual cell in an electrolytic circuit of high current capacity having a plurality of cells which comprises an enclosed vessel divided into two chambers interconnecting at the bottom of said vessel, a pool of liquid metal partially filling both of said chambers, conductor means to connect the cathode of a cell to the anode of an adjacent cell through the liquid metal in one of said chambers, comprising separate conductors having their terminal ends dipping into said liquid metal, wherein said anode conductor extends to a lesser extent into said metal, conductor means from the cathode of said adjacent cell to a point above the liquid metal in the other chamber and means to change the level of said liquid metal within the chambers to make electrical contact between said cathode conductors and break contact with said anode conductor.

4. A liquid metal switch for selectively connecting in series and switching out an individual cell in an electrolytic circuit of high current capacity having a plurality of cells which comprises an enclosed vessel divided into two compartments interconnecting at the bottom of said vessel, a pool of liquid metal partially filling both of said chambers, an electrical conductor to connect the cathode of a cell with the anode of an adjacent cell, connector means to electrically connect said conductor with the liquid metal in one of said chambers, conductor means from the cathode of said adjacent cell to a point above the liquid metal in the other chamber and means to change the level of said liquid metal within the chambers to control the electrical contact between said electrical conductors within the said chambers.

5. A liquid metal switch for selectively connecting in series and switching out an individual cell in an electrolytic circuit of high current capacity having a plurality of cells which comprises an enclosed vessel divided into two compartments interconnecting at the bottom of said vessel, a pool of liquid metal partially filling both of said chambers, an electrical series conductor to connect the cathode of a cell with the anode of an adjacent cell, conductor means leading from said series conductor into one of said chambers, conductor means from the cathode of said adjacent cell into the other of said chambers and means to change the level of said liquid metal within the chambers to control the electrical contact between said electrical conductors within the said chambers.

6. A switch for switching out an individual cell in an electrolytic circuit of high current capacity having a plurality of cells which comprises an enclosed vessel divided into two chambers interconnecting at the bottom of said vessel, a pool of liquid metal partially filling both of said chambers, an electrical contact from the anode of said individual cell dipping into one of said pools of liquid metal and extending into the other of said pools to a point below the surface thereof, an electrical contact from the cathode of said cell suspended above the surface of the other of said bodies of liquid metal, and means to change the level of said liquid metal within the chambers to control the electrical contact between said electrical contacts from said anode and said cathode, to short circuit said individual cell.

7. A switch for switching out an individual cell in an electrolytic circuit of high current capacity having a plurality of cells which comprises an enclosed vessel divided into two chambers interconnecting at the bottom of said vessel, a pool of liquid metal partially filling both of said chambers, an electrical contact from the anode of said individual cell dipping into one of said pools of liquid metal, a second electrical contact from the cathode of an adjacent cell dipping into the same said pool and extending into the other of said pools to a point below the surface thereof, an electrical contact from the cathode of said cell suspended above the surface of the other of said bodies of liquid metal, and means to change the level of said liquid metal within the chambers to control the electrical contact between said electrical contacts from said anode and said cathode, to short circuit said individual cell.

References Cited in the file of this patent

UNITED STATES PATENTS

| | | |
|---|---|---|
| 2,235,123 | Stubbins | Mar. 18, 1941 |
| 2,355,975 | Henrici | Aug. 15, 1944 |